United States Patent
Antonelli

(10) Patent No.: US 11,217,115 B1
(45) Date of Patent: Jan. 4, 2022

(54) SPORTS COACHING TACTICAL TABLE KIT

(71) Applicant: Marcelo Antonelli, West Sacramento, CA (US)

(72) Inventor: Marcelo Antonelli, West Sacramento, CA (US)

( * ) Notice: Subject to any disclaimer, the term of this patent is extended or adjusted under 35 U.S.C. 154(b) by 0 days.

(21) Appl. No.: 16/827,826

(22) Filed: Mar. 24, 2020

Related U.S. Application Data

(63) Continuation-in-part of application No. 15/688,695, filed on Aug. 28, 2017, now abandoned.

(51) Int. Cl.
  *G09B 19/00* (2006.01)
  *A63B 71/06* (2006.01)

(52) U.S. Cl.
  CPC .......... *G09B 19/0038* (2013.01); *A63B 71/06* (2013.01); *A63B 2071/0694* (2013.01); *A63B 2209/08* (2013.01); *A63B 2210/50* (2013.01)

(58) Field of Classification Search
  CPC ...... G09B 19/0038; G09B 1/02; A63B 69/00; A63F 3/00041; A63F 2003/00233
  See application file for complete search history.

(56) References Cited

U.S. PATENT DOCUMENTS

| | | |
|---|---|---|
| 1,927,695 A | 9/1933 | Andreas |
| 2,946,134 A | 7/1960 | Neilson |
| 3,995,863 A | 12/1976 | Cummins |
| 4,304,404 A | 12/1981 | Pundt |
| 4,676,527 A | 6/1987 | Palmer |
| 5,263,866 A | 11/1993 | Campbell |
| 5,626,478 A | 5/1997 | Gatlin |
| 5,772,535 A * | 6/1998 | Murphy .................... A63B 5/11 273/349 |
| 5,827,072 A | 10/1998 | Neufer |
| 6,464,507 B1 * | 10/2002 | Bailey ................ G09B 19/0038 434/247 |
| D708,669 S | 7/2014 | Sharma |
| 2005/0086844 A1 * | 4/2005 | Niester ................ A47G 1/0616 40/800 |
| 2006/0217169 A1 * | 9/2006 | Manber ..................... A63F 5/00 463/16 |

(Continued)

FOREIGN PATENT DOCUMENTS

| WO | 0033286 | 6/2000 |
|---|---|---|

*Primary Examiner* — Jeffrey S Vanderveen

(57) ABSTRACT

The sports coaching tactical table kit is a three-dimensional structure that comprises a working surface, a plurality of field images, and a plurality of operational tokens. A field image selected from the plurality of field images attaches to the working surface. Each of the plurality of operational tokens attaches to the selected field image. The sports coaching tactical table kit forms a structure that presents a model of game play that provides: a) a three-dimensional image of a field of play; b) a representation locations and movements of the critical game elements present on the field of play; and c) an easy way of representing the motion and movements of the players on the field of play. The plurality of field images are interchangeable such that the game represented by the sports coaching tactical table kit can be changed. The plurality of operational tokens are interchangeable such that the game represented by the sports coaching tactical table kit can be changed.

15 Claims, 12 Drawing Sheets

(56) References Cited

U.S. PATENT DOCUMENTS

| | | | |
|---|---|---|---|
| 2007/0215011 A1* | 9/2007 | Khan | A47B 3/10 |
| | | | 108/11 |
| 2010/0307035 A1* | 12/2010 | Malone | G09F 3/06 |
| | | | 40/1 |
| 2011/0180989 A1* | 7/2011 | Nwanna | A63F 7/0668 |
| | | | 273/108.1 |
| 2015/0217184 A1* | 8/2015 | Kolb | A63F 3/00031 |
| | | | 273/108.4 |

* cited by examiner

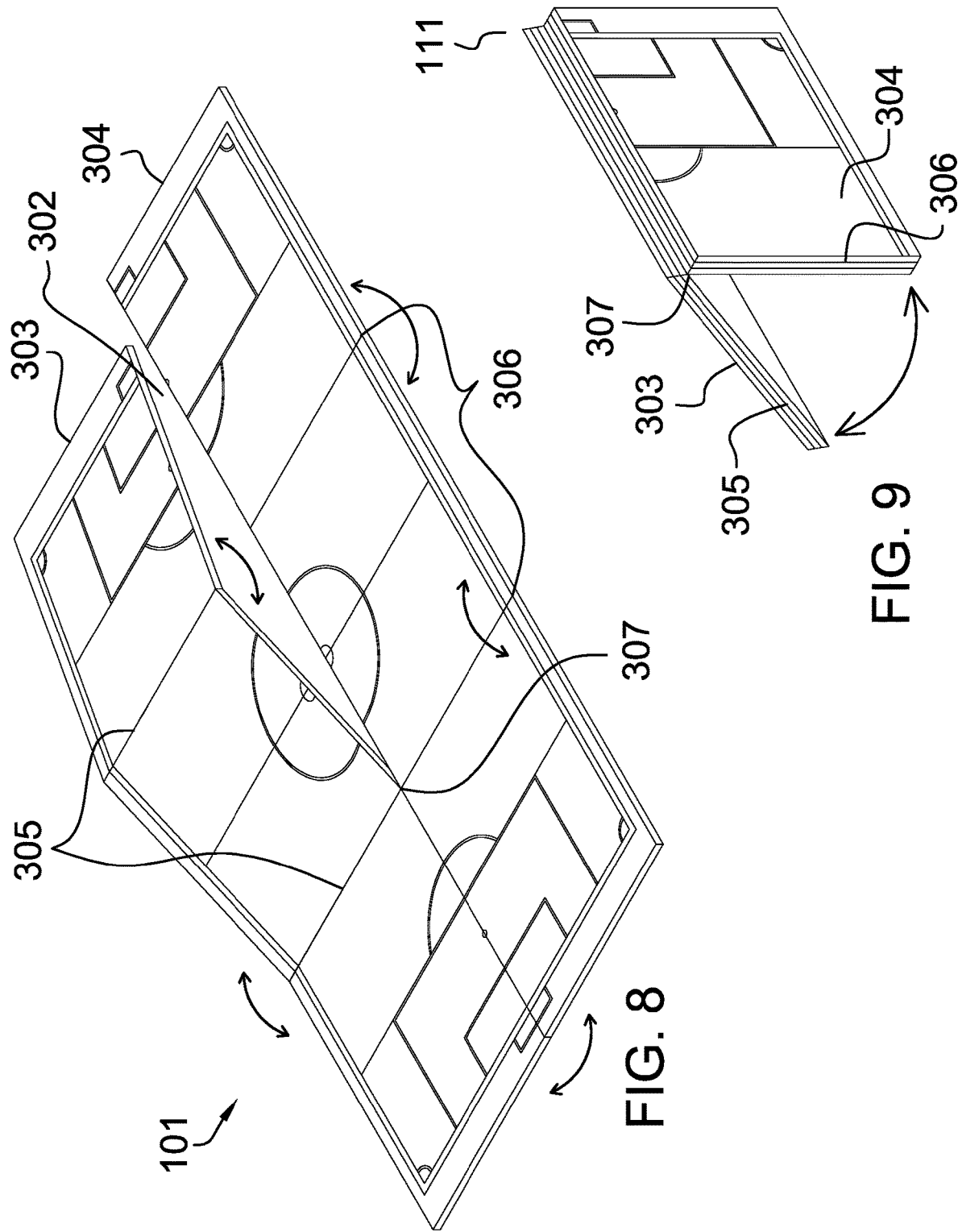

SPORTS COACHING TACTICAL TABLE KIT

CROSS REFERENCES TO RELATED APPLICATIONS

This non-provisional application is a continuation-in-part application filed under 37 CFR 1.53(b) that claims the benefit of United States 35 USC 120 from non-provisional application U.S. Ser. No. 15/688,695 filed on Aug. 28, 2017 by the inventor: Marcelo Augusto Antonella of West Sacramento, Calif. This non-provisional application incorporates non-provisional application U.S. Ser. No. 15/688,695 in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics and instruments including education and demonstration appliances, more specifically, a teaching apparatus configured for use in sequencing sports movements. (G09B19/0038)

SUMMARY OF INVENTION

This non-provisional application is a continuation-in-part application filed under 37 CFR 1.53(b) that claims the benefit of United States 35 USC 120 from non-provisional application U.S. Ser. No. 15/688,695 filed on Aug. 28, 2017 by the inventor: Marcelo Augusto Antonella of West Sacramento, Calif. This non-provisional application incorporates non-provisional application U.S. Ser. No. 15/688,695 in its entirety.

The present disclosure will only reference the elements of the non-provisional application U.S. Ser. No. 15/688,695 that are relevant to the innovations disclosed within this application. This is done for purposes of simplicity and clarity of exposition. The applicant notes that this disclosure incorporates non-provisional application U.S. Ser. No. 15/688,695 in its entirety into this application. The fact that any specific innovation selected from the one or more innovations disclosed within U.S. Ser. No. 15/688,695 is not addressed in this application should not be interpreted as an indication of defect in the above referenced patent.

Within this disclosure, the non-provisional application U.S. Ser. No. 15/688,695 will also be referred to as the prior disclosure.

The sports coaching tactical table kit is a three-dimensional structure that comprises a working surface, a plurality of field images, and a plurality of operational tokens. An individual field image selected from the plurality of field images attaches to the working surface. Each of the plurality of operational tokens attaches to the selected individual field image. The sports coaching tactical table kit forms a structure that presents a model of game play that provides: a) a three-dimensional image of a field of play; b) a representation locations and movements of the critical game elements present on the field of play; and c) an easy way of representing the motion and movements of the players on the field of play. The plurality of field images are interchangeable such that the game represented by the sports coaching tactical table kit can be changed. The plurality of operational tokens are interchangeable such that the game represented by the sports coaching tactical table kit can be changed.

These together with additional objects, features and advantages of the sports coaching tactical table kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the sports coaching tactical table kit in detail, it is to be understood that the sports coaching tactical table kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sports coaching tactical table kit.

It is therefore important that the claims be regarded as including such equivalent construction insofar as they do not depart from the spirit and scope of the sports coaching tactical table kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 8 is a detail view of an alternate embodiment of the disclosure.

FIG. 9 is a detail view of an alternate embodiment of the disclosure.

DETAILED DESCRIPTION OF THE EMBODIMENT

Figure 1:
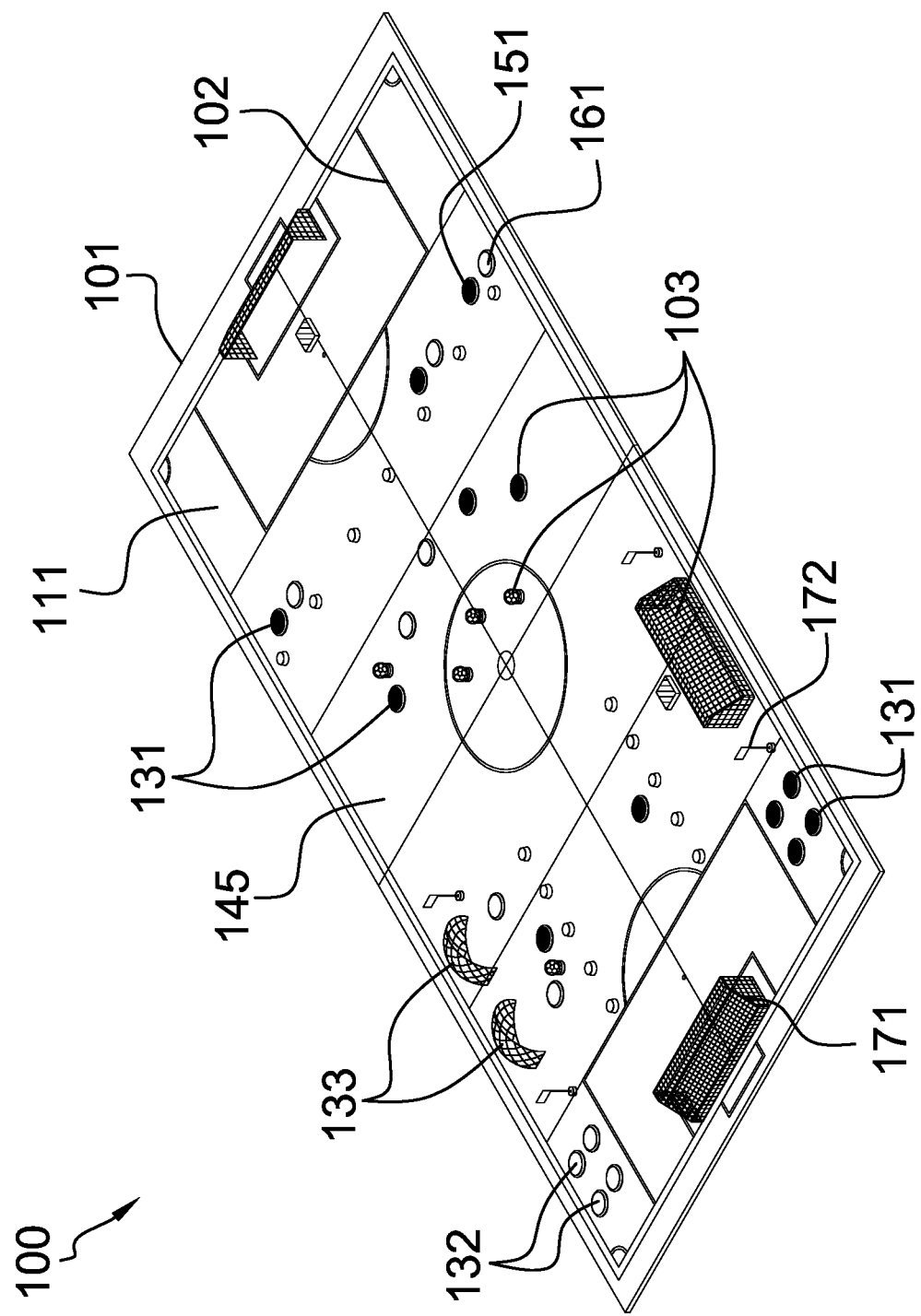
FIG. 1 is a perspective view of an embodiment of the disclosure.
Figure 2:
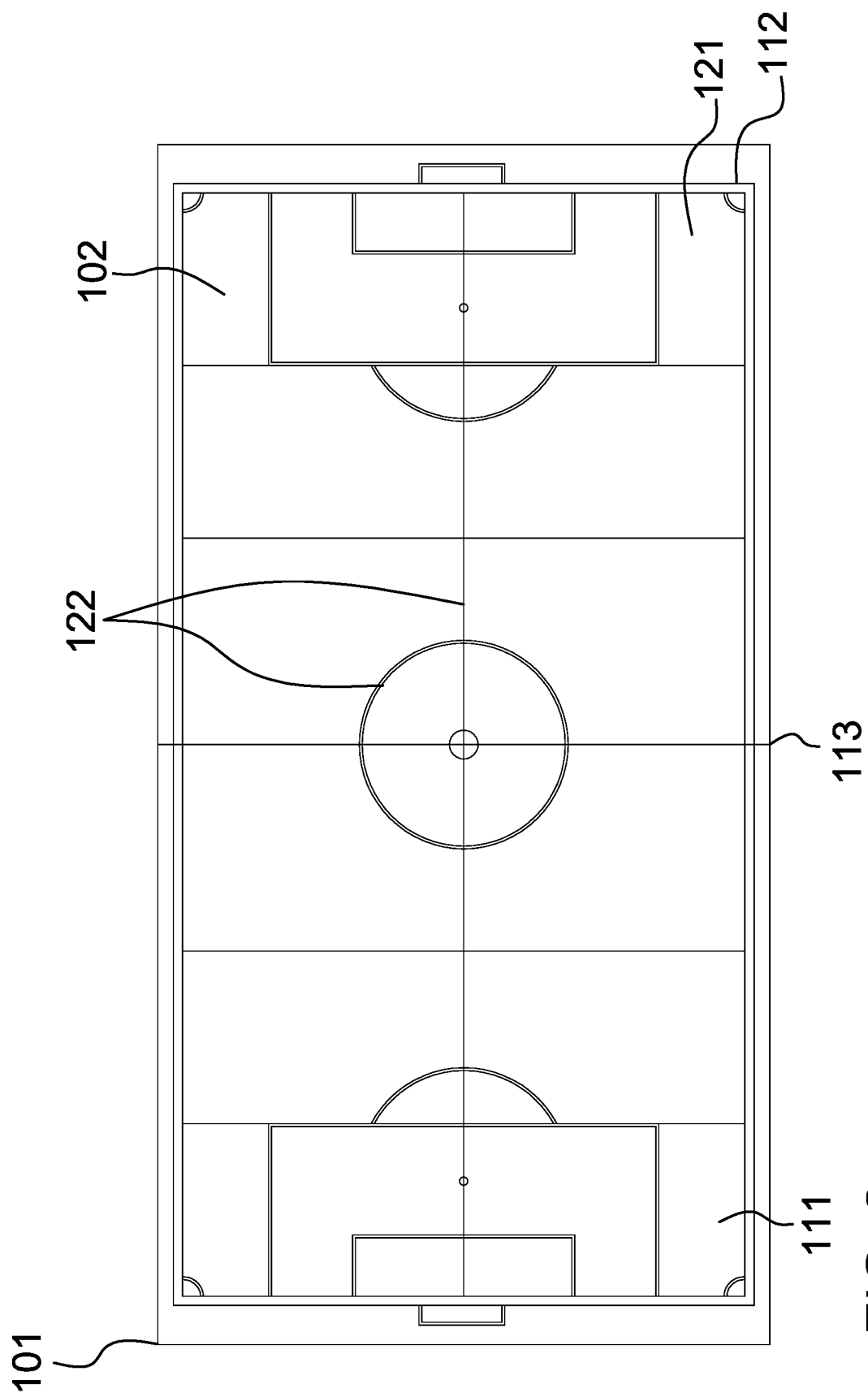
FIG. 2 is a top view of an embodiment of the disclosure.
Figure 3:
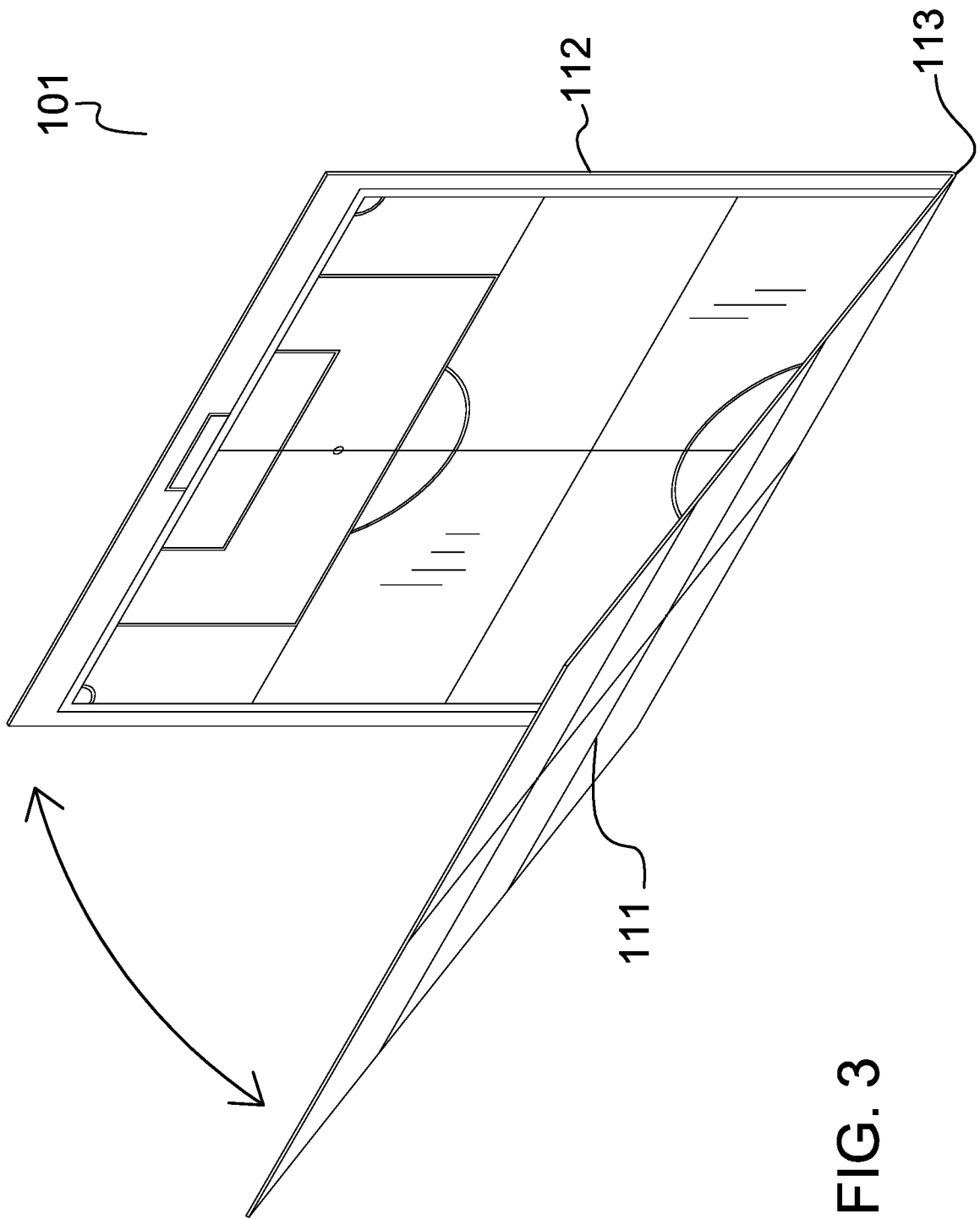
FIG. 3 is a perspective view of an embodiment of the disclosure.
Figure 4:
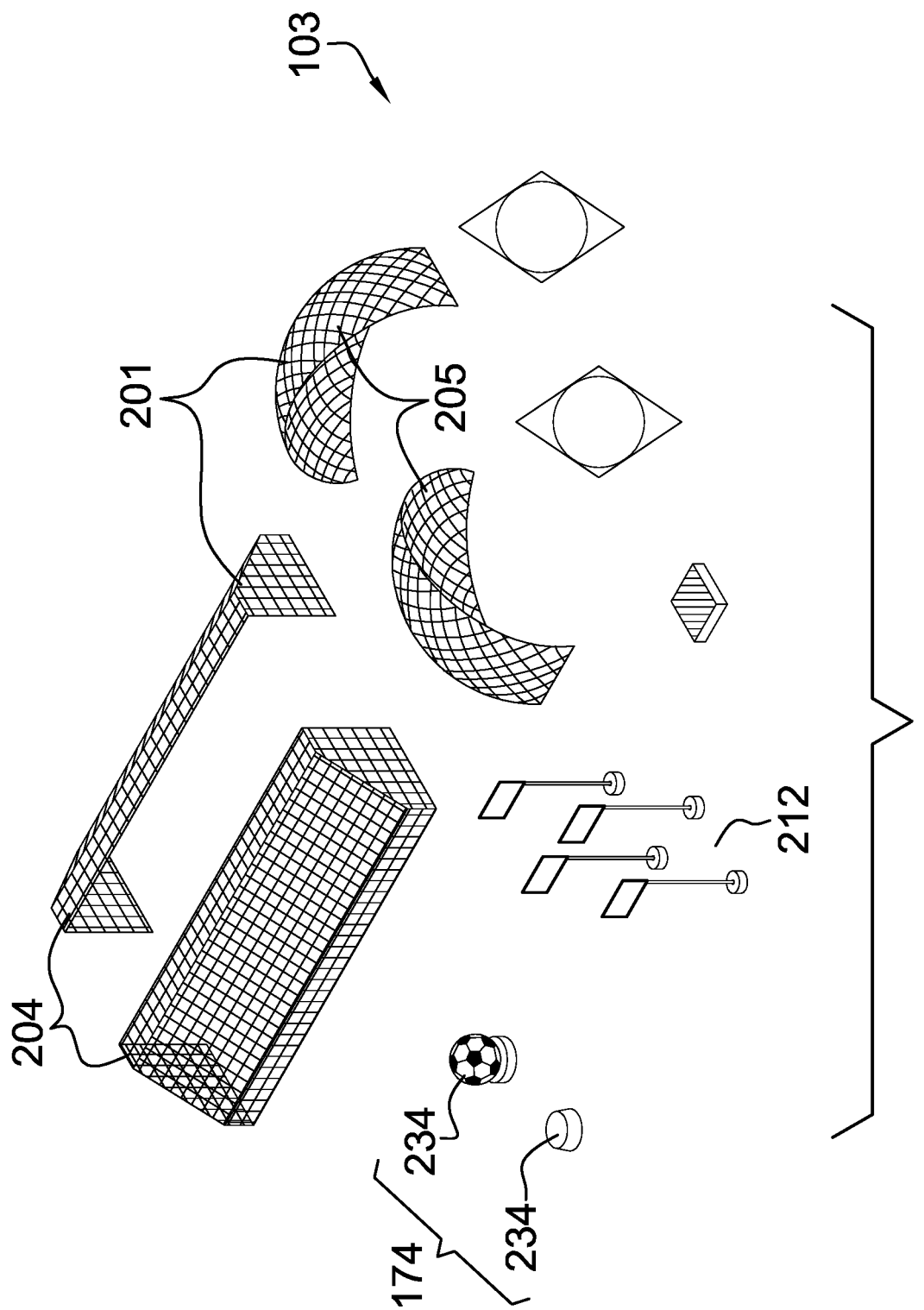
FIG. 4 is a detail view of an embodiment of the disclosure.
Figure 5:
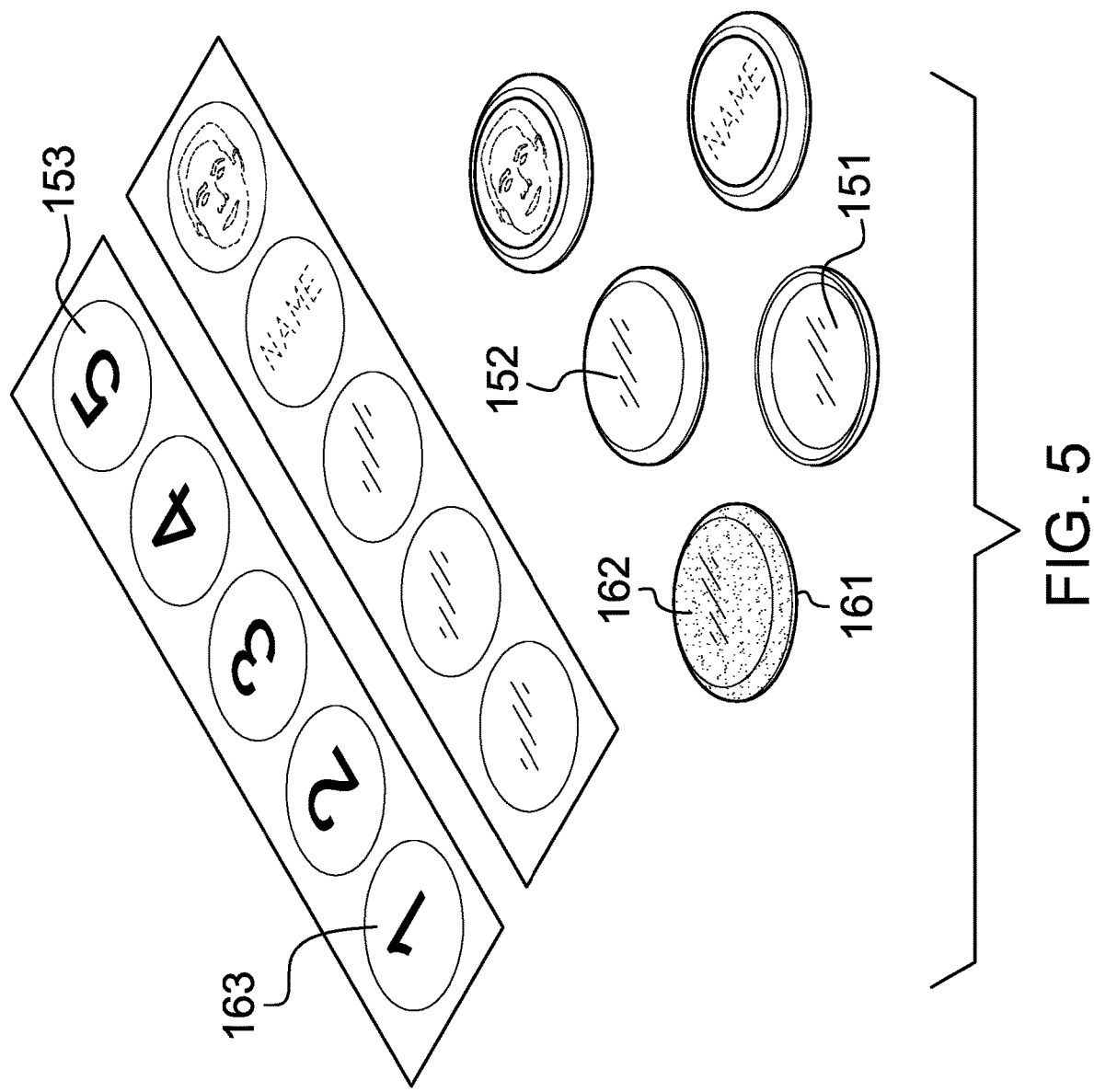
FIG. 5 is a detail view of an embodiment of the disclosure.
Figure 6:
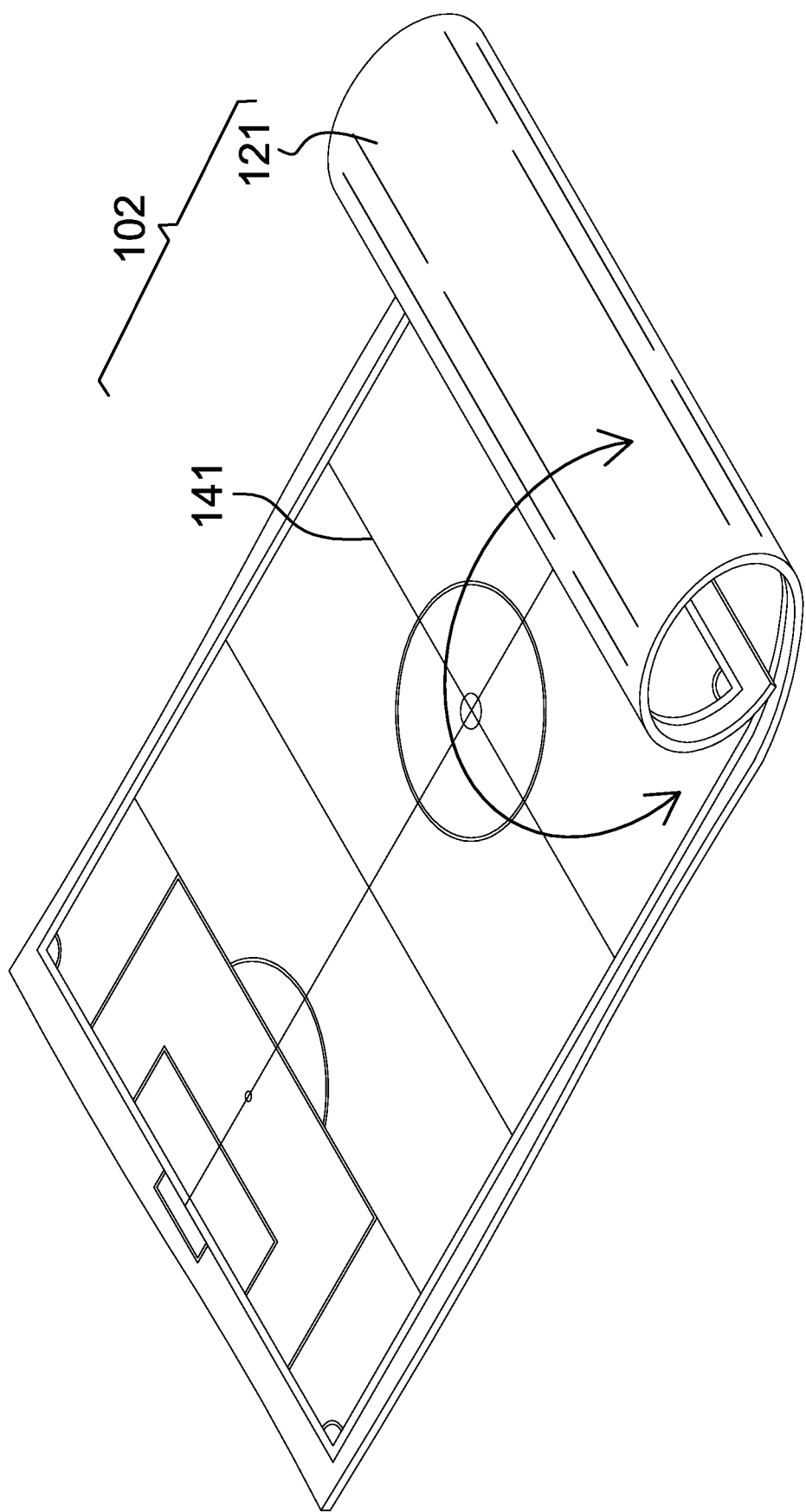
FIG. 6 is a perspective view of an alternate embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

This non-provisional application is a continuation-in-part application filed under 37 CFR 1.53(b) that claims the benefit of United States 35 USC 120 from non-provisional application U.S. Ser. No. 15/688,695 filed on Aug. 28, 2017 by the inventor: Marcelo Augusto Antonella of West Sacramento, Calif. This non-provisional application incorporates non-provisional application U.S. Ser. No. 15/688,695 in its entirety.

The present disclosure will only reference the elements of the non-provisional application U.S. Ser. No. 15/688,695 that are relevant to the innovations disclosed within this application. This is done for purposes of simplicity and clarity of exposition. The applicant notes that this disclosure incorporates non-provisional application U.S. Ser. No. 15/688,695 in its entirety into this application. The fact that any specific innovation selected from the one or more innovations disclosed within U.S. Ser. No. 15/688,695 is not addressed in this application should not be interpreted as an indication of defect in the above referenced patent.

Within this disclosure, the non-provisional application U.S. Ser. No. 15/688,695 will also be referred to as the prior disclosure. Detailed reference will now be made to one or more potential embodiments of the disclosure, which are illustrated in FIGS. 1 through 14.

The sports coaching tactical table kit 100 (hereinafter invention) is a three-dimensional structure that comprises a working surface 101, a plurality of field images 102, and a plurality of operational tokens 103. An individual field image 141 selected from the plurality of field images 102 attaches to the working surface 101. Each of the plurality of operational tokens 103 attaches to the selected individual field image 141. The invention 100 forms a structure that presents a model of game play that provides: a) a three-dimensional image of a field of play; b) a representation locations and movements of the critical game elements present on the field of play; and c) an easy way of representing the motion and movements of the players on the field of play. The plurality of field images 102 are interchangeable such that the game represented by the invention 100 can be changed. The plurality of operational tokens 103 are interchangeable such that the game situations represented by the invention 100 can be changed.

The working surface 101 is a disk-shaped structure. The working surface 101 is a plate structure. The working surface is formed from a magnetic material. The working surface 101 forms a display surface to which an individual field image 141 selected from the plurality of field images 102 attaches. Any individual field image 141 selected from the plurality of field images 102 magnetically attaches to the working surface 101. The working surface 101 forms the surface on which the plurality of field images 102 and the plurality of operational tokens 103 are displayed during the use of the invention 100.

In the first potential embodiment of the disclosure, the working surface 101 comprises a first plate 111.

The first plate 111 is a prism-shaped structure. The first plate 111 is a disk-shaped structure. The first plate 111 is formed from a magnetic material such that a magnet will attach to the first plate 111. Any individual field image 141 selected from the plurality of field images 102 magnetically attaches to the first plate 111 for display.

Each of the plurality of field images 102 is a sheeting that presents an individual field image 141 of the playing field of the game being presented on the invention 100. Each of the plurality of field images 102 removably attaches to the working surface 101 such that any first individual field image 141 attached to the working surface 101 can be interchanged with any second individual field image 141 selected from the plurality of field images 102. Each of the plurality of field images 102 is a magnetic structure. Each of the plurality of field images 102 magnetically attaches to the working surface 101 such that any individual field image 141 selected from the plurality of field images 102 remains securely in place during the use of the invention 100. The plurality of field images 102 comprises a collection of individual field images 141. Each individual field image 141 magnetically attaches to the working surface 101. Each individual field image 141 customizes the invention 100 for use with a specific game.

Each individual field image 141 comprises a display sheeting 121 and an applied image 122.

The display sheeting 121 is a sheeting. The display sheeting 121 is a flexible structure such that the display sheeting 121 can be rolled into a scroll for storage. The display sheeting 121 is coated with a coating that provides the display sheeting 121 with magnetic properties. The display sheeting 121 attaches magnetically to the working surface 101.

In the first potential embodiment of the disclosure, the form factor of the display sheeting 121 is geometrically similar to the form factor of the first plate 111 such that the display sheeting 121 fits within the perimeter of the first plate 111.

The applied image 122 is an image that is applied to the face of the disk structure of the first plate 111. The applied image 122 is formed on a face of the first plate 111 such that the applied image 122 is visible from the display surface of the working surface 101. The applied image 122 comprises indicia that are arranged to generate a sentiment that symbolized the field of play of a game. The applied image 122 displays the image of a soccer field 145 to accommodate the use of the invention 100 for teaching soccer.

In a second potential embodiment of the disclosure, the working surface 101 further comprises a second plate 112 and a living hinge 113.

The second plate 112 is a prism-shaped structure. The second plate 112 is a disk-shaped structure. The second plate 112 is formed from a magnetic material such that a magnet will attach to the second plate 112. The form factor of the second plate 112 is identical to the form factor of the first plate 111.

The living hinge 113 is a flexure bearing. The living hinge 113 attaches the second plate 112 to the first plate 111 such that the second plate 112 rotates relative to the first plate 111.

In the second potential embodiment of the disclosure, any individual field image 141 selected from the plurality of field images 102 magnetically attaches to both the first plate 111 and the second plate 112 for display.

In second potential embodiment of the disclosure, the form factor of the display sheeting 121 is geometrically similar to the form factor of the working surface 101 formed by the combination of the first plate 111, the second plate 112, and the living hinge 113 such that the display sheeting 121 fits within the perimeter of the display surface of the working surface 101.

In the second potential embodiment of the disclosure, the image of the applied image 122 is further expanded into the additional surface area provided by the second plate 112 that was attached to the first plate 111 by the living hinge 113.

Each of the plurality of operational tokens 103 is a token that represents an element of the game associated with an individual field image 141 selected from the plurality of field images 102. Each of the plurality of operational tokens 103 is partially formed from a magnetic material such that any selected token will magnetically attach to any individual field image 141 that is selected for use from the plurality of field images 102. Each of the plurality of operational tokens 103 represents an element of the game that is modeled by the invention 100. The plurality of operational tokens 103 comprises a plurality of team tokens 131, a plurality of opposition tokens 132, and a plurality of field tokens 133.

Each of the plurality of team tokens 131 is a token that represents a player of a first team that is on the field of play of the game. Each of the plurality of team tokens 131 is formed from a magnetic material such that each team token magnetically attaches to the display sheeting 121 of the individual field image 141 attached to the working surface 101. Each of the plurality of team tokens 131 is placed on the display sheeting 121 of the individual field image 141 to indicate the position of a player relative to the sentiment presented by the applied image 122. The plurality of team tokens 131 comprises a collection of individual team player tokens 151.

The individual team player token 151 is a token selected from the plurality of team tokens 131. Any first individual team player token 151 selected from the plurality of team tokens 131 is visually distinct from any second individual team player token 151 selected from the plurality of team tokens 131 such that each of the plurality of team tokens 131 can be uniquely identified while attached to the individual field image 141 selected for use on the working surface 101.

Each individual team player token 151 comprises a team disk 152 and a team player indicia 153.

The team disk 152 is a prism-shaped structure. The team disk 152 is a disk-shaped structure. The team disk 152 is formed from a magnetic material. The team disk 152 magnetically attaches to the individual field image 141 attached to the working surface 101. The team player indicia 153 is an indicia that presents the sentiment of a number. The team player indicia 153 is displayed from a face of the disk structure of its associated team disk 152. The team player indicia 153 displayed on the team disk 152 of any first individual team player token 151 selected from the plurality of team tokens 131 is visually distinct from the team player indicia 153 of any second team disk 152 of any second individual team player token 151 selected from the plurality of team tokens 131.

Each of the plurality of opposition tokens 132 is a token that represents a player of a second team that is on the field of play of the game. Each of the plurality of opposition tokens 132 is formed from a magnetic material such that each team token magnetically attaches to the display sheeting 121 of the individual field image 141 attached to the working surface 101. Each of the plurality of opposition tokens 132 is placed on the display sheeting 121 of the individual field image 141 to indicate the position of a player relative to the sentiment presented by the applied image 122. The plurality of opposition tokens 132 comprises a collection of individual opposition player tokens 161.

Each individual opposition player token 161 is a token selected from the plurality of opposition tokens 132. Any first individual opposition player token 161 selected from the plurality of opposition tokens 132 is visually distinct from any second individual opposition player token 161 selected from the plurality of opposition tokens 132 such that each of the plurality of opposition tokens 132 can be uniquely identified while attached to the individual field image 141 selected for use on the working surface 101. Each individual opposition player token 161 is visually distinct from each individual team player token 151. Each individual opposition player token 161 comprises an opposition disk 162 and an opposition player indicia 163.

The opposition disk 162 is a prism-shaped structure. The opposition disk 162 is a disk-shaped structure. The opposition disk 162 is formed from a magnetic material. The opposition disk 162 magnetically attaches to the individual field image 141 attached to the working surface 101. The opposition player indicia 163 is an indicia that presents the sentiment of a number. The opposition player indicia 163 is displayed from a face of the disk structure of its associated opposition disk 162. The opposition player indicia 163 displayed on the opposition disk 162 of any first individual opposition player token 161 selected from the plurality of opposition tokens 132 is visually distinct from the opposition player indicia 163 of any second opposition disk 162 of any second individual opposition player token 161 selected from the plurality of opposition tokens 132.

Each of the plurality of field tokens 133 is a token that represents a game structure that is found on the field of play of the game. Each of the plurality of field tokens 133 is formed from a magnetic material such that each field token magnetically attaches to the display sheeting 121 of the individual field image 141 attached to the working surface 101. Each of the plurality of field tokens 133 is placed on the display sheeting 121 of the individual field image 141 to indicate the position of a game structure relative to the sentiment presented by the applied image 122. The plurality of field tokens 133 comprises a plurality of goal sets 171, a plurality of flag sets 172, and a plurality of ball tokens 174.

Each of the plurality of goal sets 171 is a token that visibly represents one or more goals used in the game of soccer. The plurality of goal sets 171 comprises a soccer goal set 201.

The soccer goal set 201 is a visual representation of the two goals commonly used in a game of soccer. The soccer goal set 201 further comprises a full size goal set 204 and a reduced size goal set 205. The full size goal set 204 is a visual representation of the two full size goals commonly used in a professional game of soccer. The reduced size goal set 205 is a visual representation of the two reduced size goals commonly used in an amateur game of soccer.

Each of the plurality of flag sets 172 is a token that visibly represents one or more flags used in a game of soccer. In the first potential embodiment of the disclosure, the plurality of flag sets 172 comprises a soccer flag set 212. The soccer flag set 212 is a visual representation of the flags that are commonly used to mark the corners in a game of soccer.

Each of the plurality of ball tokens 174 is a token that identifies a soccer ball 234. In the first potential embodiment of the disclosure, the plurality of ball tokens 174 comprises a soccer ball 234. The soccer ball 234 is a visual representation of the ball that is commonly used in the game of soccer.

Figure 7:
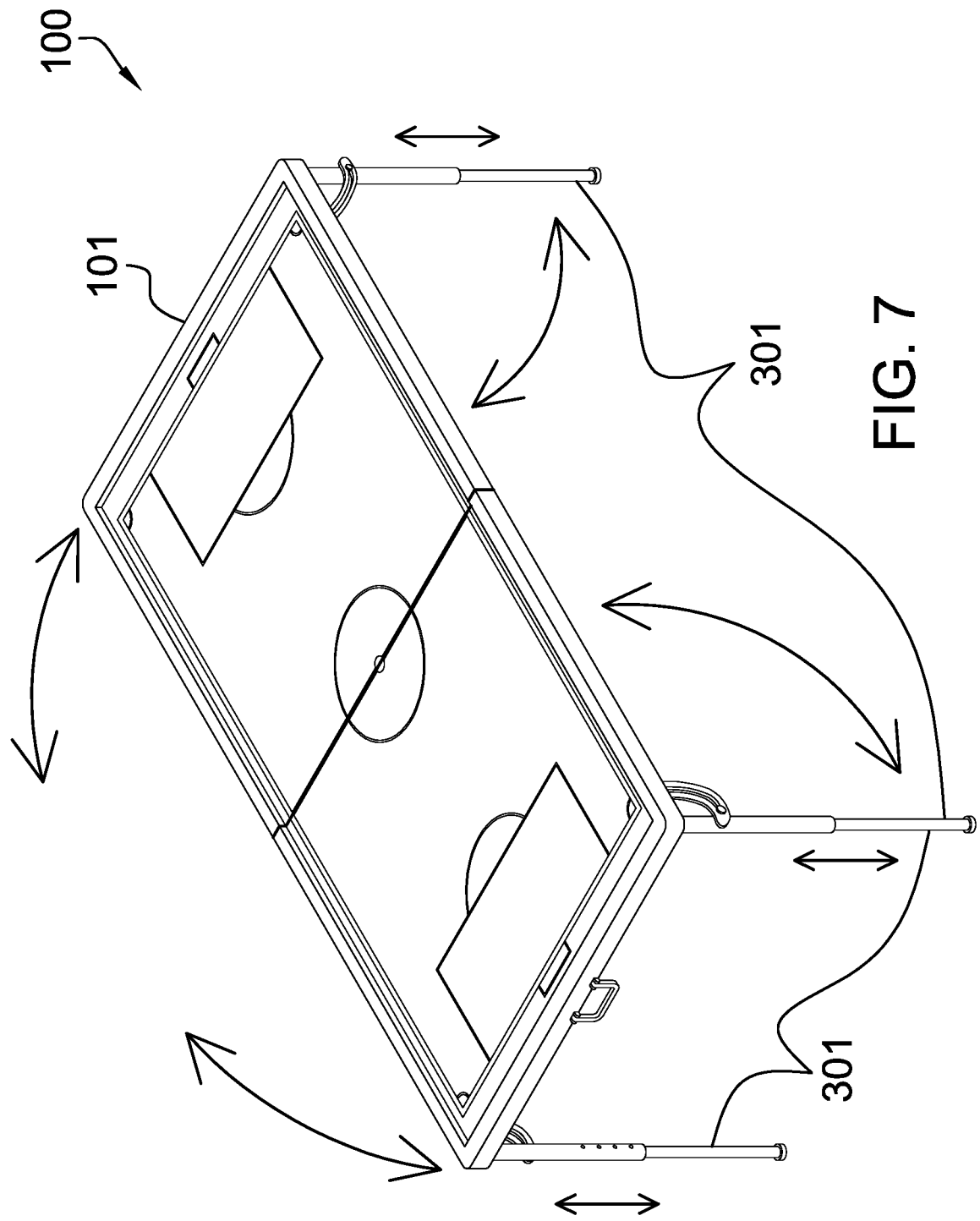
FIG. 7 is a detail view of an alternate embodiment of the disclosure.

The second potential embodiment of the disclosure is now extended to form a third potential embodiment of the disclosure which is shown in FIG. 7. The third potential embodiment of the disclosure elevates the working surface for form a horizontal surface that is elevated above a supporting surface. The third potential embodiment of the disclosure further comprises a plurality of telescopic stanchions 301. The plurality of telescopic stanchions 301 attach to the working surface 101 such that the working surface 101 forms a horizontally oriented surface that is elevated above a supporting surface. The span of the length of each of the plurality of telescopic stanchions 301 is adjustable such that the elevation of the working surface 101 is adjustable. The plurality of telescopic stanchions 301 attach to the working surface 101 such that each of the plurality of telescopic stanchions 301 rotates relative to the working surface 101. The combination of the living hinge 113 and the rotation of the plurality of telescopic stanchions 301 allows the third potential embodiment of the disclosure to fold such that the third potential embodiment of the disclosure will collapse for storage.

The first potential embodiment of the disclosure is now extended to form a fourth potential embodiment of the disclosure which is shown in FIGS. 8 and 9. The fourth potential embodiment of the disclosure further comprises a slit 302. The slit 302 is cut through the working surface 101 from the perimeter of the working surface 101 to an interior termination point 307 on the working surface 101. The slit 302 divides the working surface 101 into a first raw panel 303 and a second raw panel 304. The first raw panel 303 is further formed with a first plurality of living hinges 305. As shown most clearly in FIG. 9, he first plurality of living hinges 305 are configured to allow the first panel 303 to fold onto itself and the working surface 101 to form a collapsed structure. The second raw panel 304 is further formed with a second plurality of living hinges 306. As shown most clearly in FIG. 9, he second plurality of living hinges 306 are configured to allow the second panel 304 to fold onto itself and the working surface 101 to form a collapsed structure.

Figure 11:
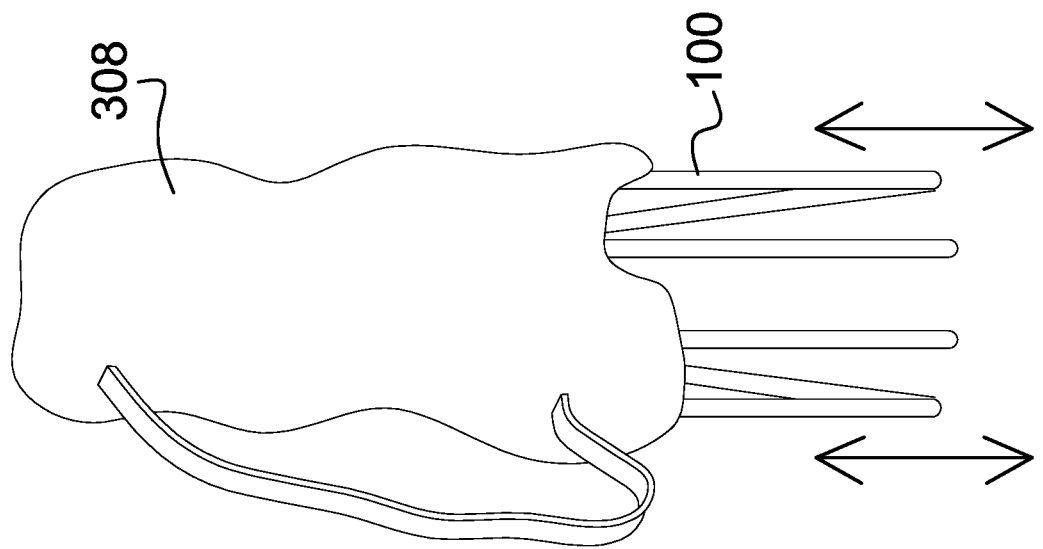
FIG. 11 is a detail view of an alternate embodiment of the disclosure.
Figure 10:
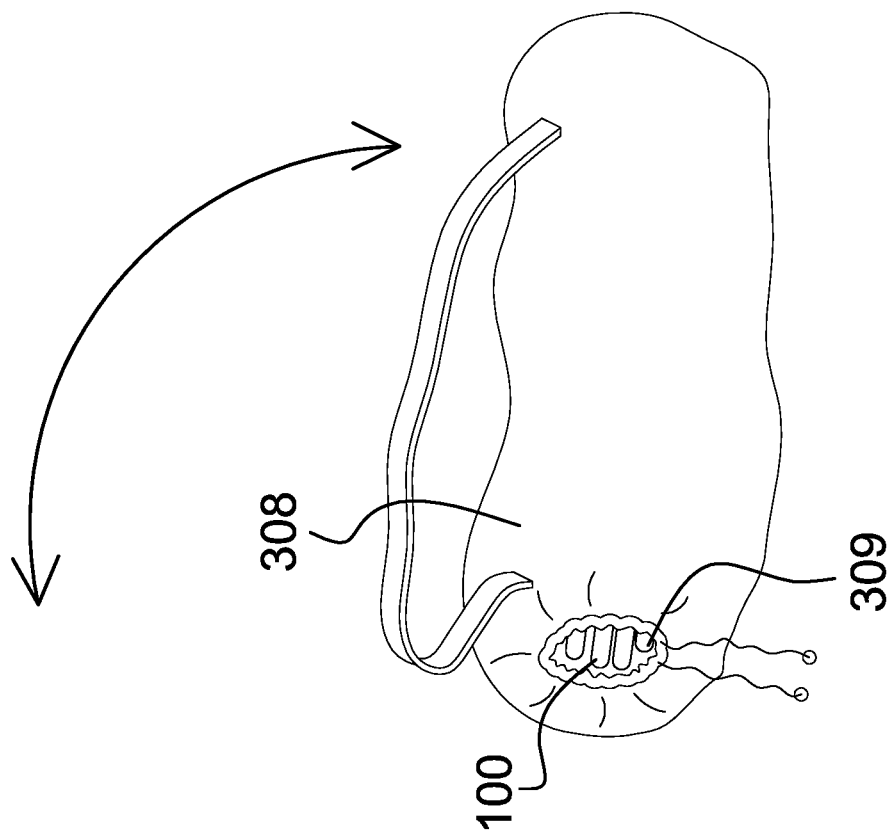
FIG. 10 is a detail view of an alternate embodiment of the disclosure.

The first potential embodiment of the disclosure, the second potential embodiment of the disclosure, the third potential embodiment of the disclosure, and the fourth potential embodiment of the disclosure, are now extended to form a fifth potential embodiment of the disclosure as shown in FIGS. 10 and 11. In the fifth potential embodiment of the disclosure: a) the first potential embodiment of the disclosure further comprises a bag 308 and a cord lock 309; b) the second potential embodiment of the disclosure further comprises a bag 308 and a cord lock 309; c) the third potential embodiment of the disclosure further comprises a bag 308 and a cord lock 309; and, d) the fourth potential embodiment of the disclosure further comprises a bag 308 and a cord lock 309. The bag 308 is a sheeting structure used to enclose each instantiation of the invention 100 when the instantiation of the invention 100 is collapsed into a storage position. The bag 308 is a flexible sheeting-based storage structure with a single aperture. The invention 100 inserts into the bag 308. The bag 308 is defined elsewhere in this disclosure. The cord lock 309 is a mechanical structure used to secure the single aperture of the bag 308 in a closed position. The cord lock 309 is defined elsewhere in this disclosure.

Figure 12:
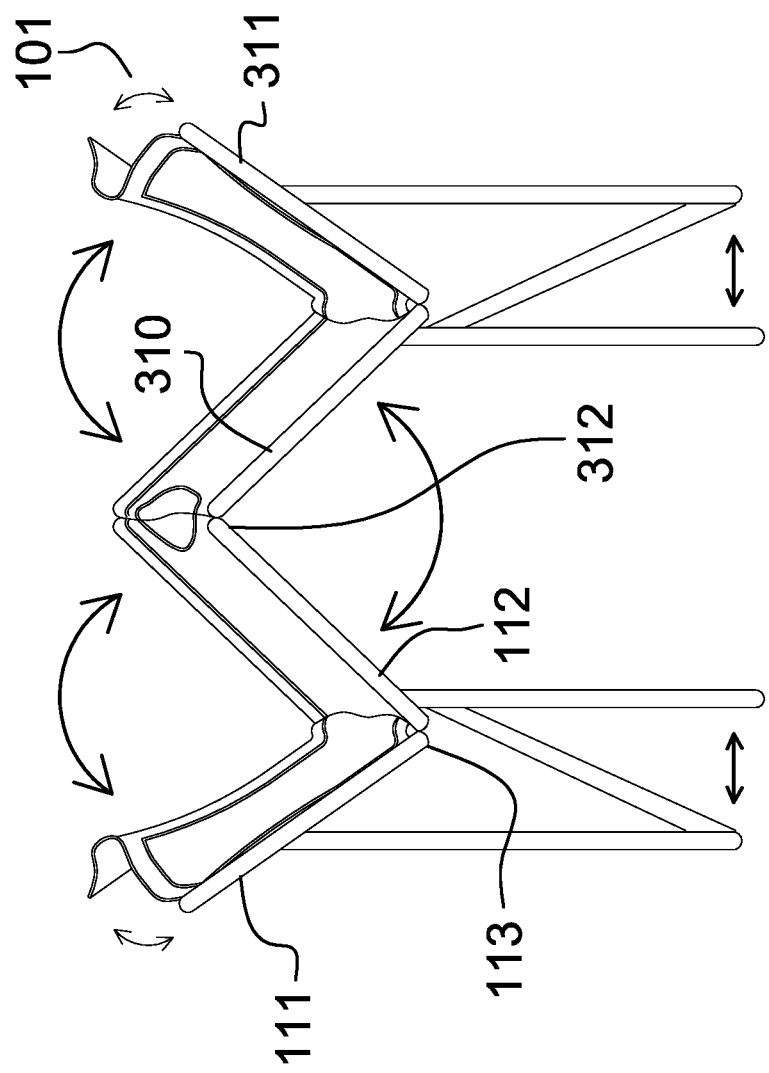
FIG. 12 is a detail view of an alternate embodiment of the disclosure.

The second potential embodiment of the disclosure is now extended to form a sixth potential embodiment of the disclosure which is shown in FIG. 12. The sixth potential embodiment of the disclosure further comprises a third panel 310, a fourth panel 311, and a third plurality of living hinges 312. The plurality of living hinges 312 attaches: a) the third panel 310 to the second panel 112; and, b) the fourth panel 311 to the third panel 310. The third panel 310 attaches to the second panel 112 such that the third panel 310 rotates relative to the second panel 112. The fourth panel 311 attaches to the third panel 310 such that the fourth panel 311 rotates relative to the third panel 310. The purpose of the sixth potential embodiment of the disclosure is to allow the working surface 101 to collapse into a smaller volume than has been presented in the first through fifth potential embodiments of the disclosure.

Figure 13:
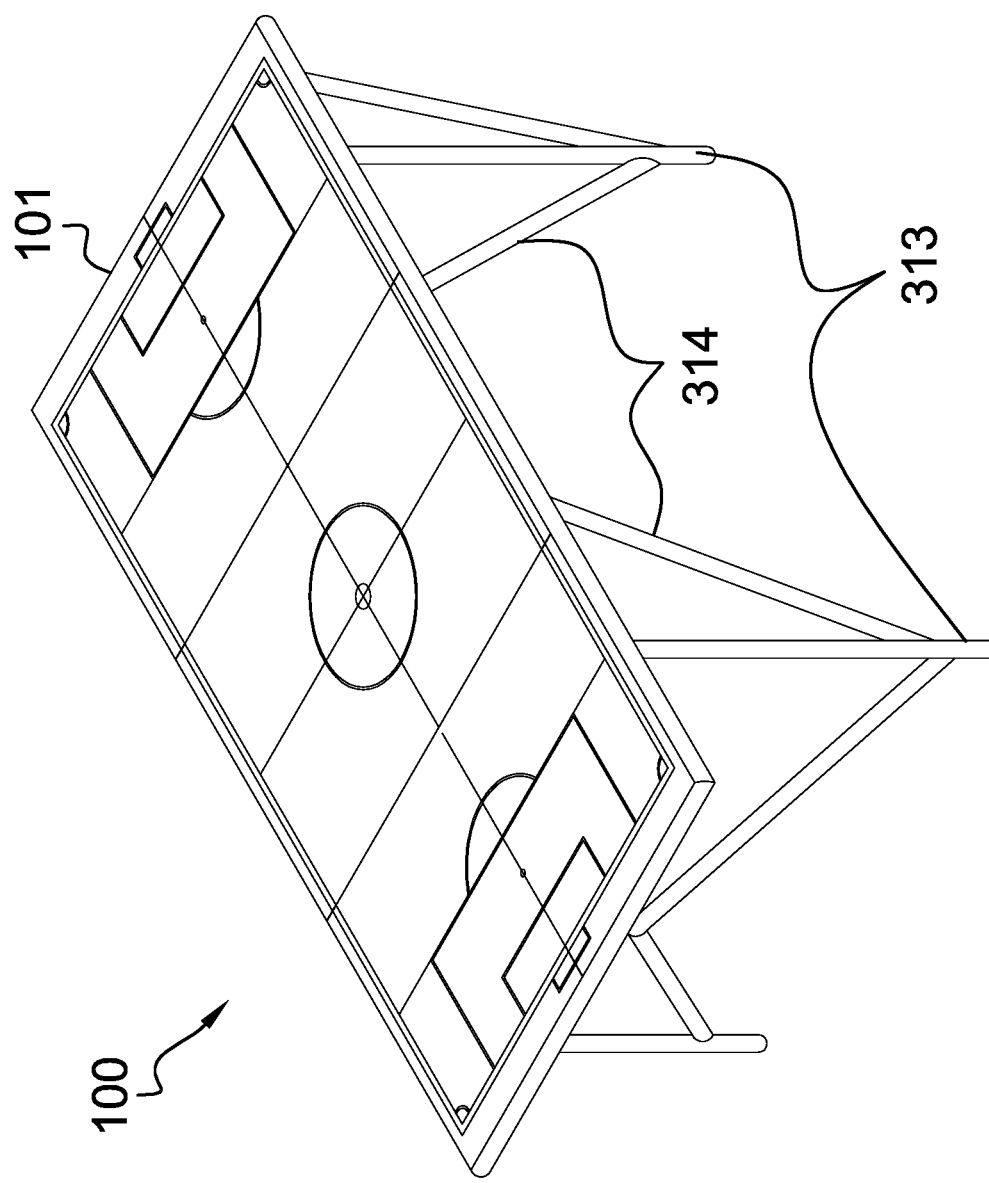
FIG. 13 is a detail view of an alternate embodiment of the disclosure.

The first potential embodiment of the disclosure is now extended to form a seventh potential embodiment of the disclosure which is shown in FIG. 13. The seventh potential embodiment of the disclosure is a non-collapsible structure that is intended for permanently placement at a location. The seventh potential embodiment of the disclosure further comprises a first plurality of stanchions 313 and a plurality of gussets 314. The first plurality of stanchions 313 elevate the working surface 101 above the supporting surface. The plurality of gussets 314 brace the first plurality of stanchions 313 to the working surface 101 such that the seventh potential embodiment of the disclosure is insensitive to random impacts that may be received from those near the invention 100 during the use of the invention 100.

Figure 14:
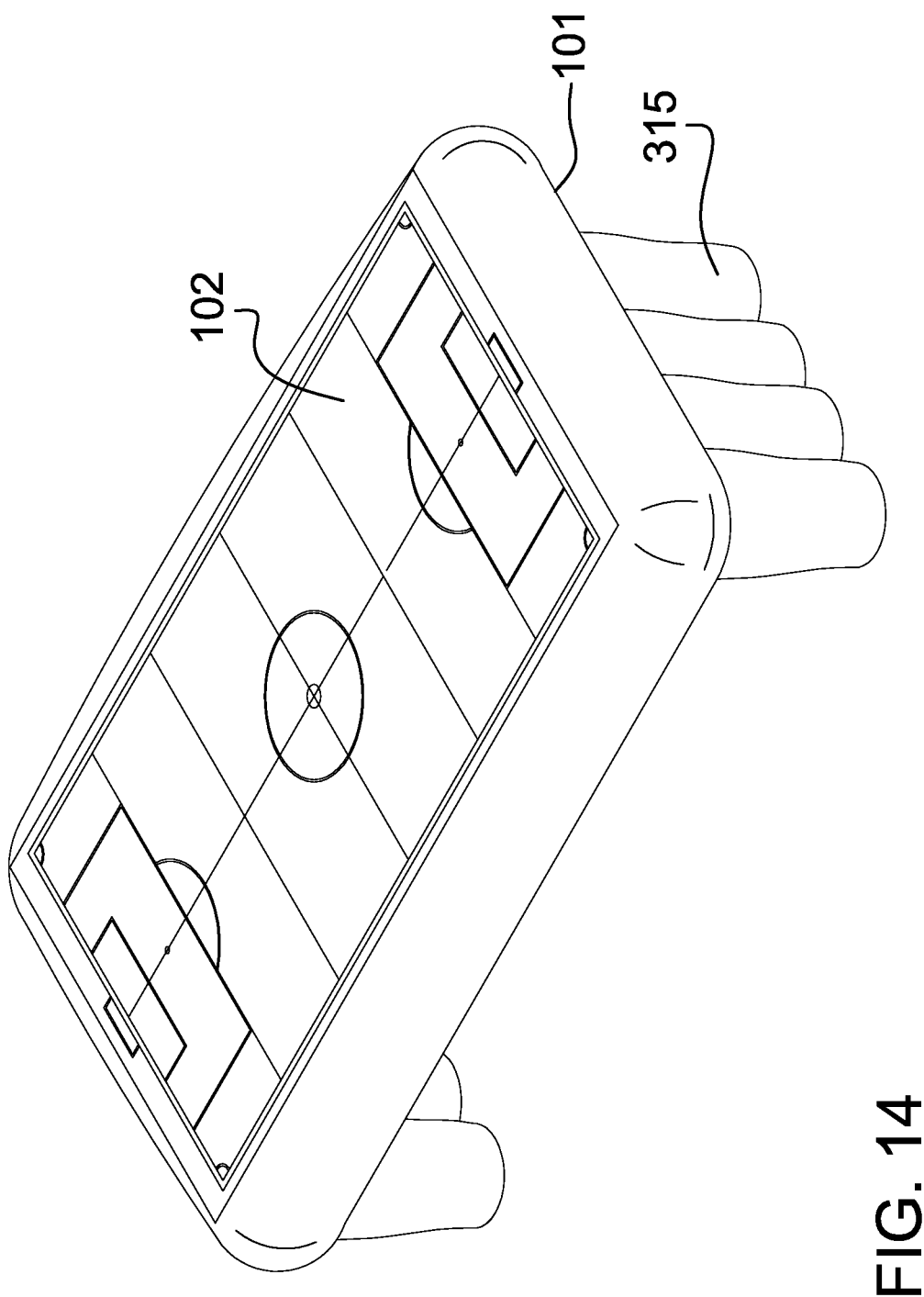
FIG. 14 is a detail view of an alternate embodiment of the disclosure.

The first potential embodiment of the disclosure is now extended to form an eight potential embodiment of the disclosure which is shown in FIG. 14. In the eighth potential embodiment of the disclosure, the working surface 101 is formed as an inflatable structure 315. The working surface 101 continues to receive the plurality of field images 102 and the plurality of operating tokens 103 as normal, however, the inflatable structure 315 of the eighth potential embodiment of the disclosure lightens the weight of the invention 100 for transport while maintaining a collapsible nature for the invention 100.

The following definitions were used in this disclosure:

Bag: As used in this disclosure, a bag is a container made of a flexible material. The bag has a single opening which allows the bag to receive the items to be contained.

Coating: As used in this disclosure, a coating refers to a substance that is applied to the exterior surface of an object such that the coating forms a new exterior surface of the object. A coating is commonly said to be formed as a layer. Paint is an example of a common coating material.

Collapsible: As used in this disclosure, the terms collapsible refers to an object that is configured such that the volume of the object is adjustable. The verb collapse means that the volume of the object is adjusted from a larger volume to a smaller volume. The verbs expand and deploy mean that the volume of the object is adjusted from a smaller volume to a larger volume.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Cord Lock: As used in this disclosure, a cord lock is a device that: a) is used to tighten cords or drawstrings without the use of knots; or, b) is used to form a loop in a cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Flexure Bearing: As used in this disclosure, a flexure bearing is a thin and flexible material that is used to attach, or bind, a first object to a second object such that the first object can rotate in a controlled direction relative to the second object.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Gusset: As used in this disclosure, a gusset is an angled structural member used to stabilize a section of a framework. By angled is meant that the gusset is neither parallel nor perpendicular to the structures being stabilized.

Image: As used in this disclosure, an image is an optical representation or reproduction of an indicia or of the appearance of something or someone.

Indicia: As used in this disclosure, the term indicia refers to a set of markings that identify a sentiment. See sentiment.

Inflatable Structure: As used in this disclosure, an inflatable structure is a fluid impermeable semi-rigid structure that is configured to contain a gas under pressure. The volume of the containment space formed by the inflatable structure is a function of the pressure differential between the pressure of the gas contained within the inflatable structure and the pressure of the exterior gas surrounding the inflatable structure.

Instantiation: As used in this disclosure, an instantiation refers to a specific physical object or process that is created using a specification.

Living Hinge: As used in this disclosure, refers to a single object that is formed out of elastomeric material that is divided into a first segment, a second segment and the living hinge. The elastic nature of the elastomeric material allow the living hinge to be flexed in the manner of a hinge allowing the first segment to rotate relative to the second hinge. The living hinge is a form of a flexure bearing. A material that is formed with a series of parallel living hinges is referred to as a kerf bending. A kerf bending formed in a plate allows the plate to be bent into a curved shape.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field.

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic, and antiferromagnetic.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Raw Edge: As used in this disclosure, a raw edge refers to one of two edges that are formed when a slit is formed in an object. The one or more ends of the slit are called the termination points.

Roll: As used in this disclosure, a roll is a method of storing paper or other sheeting as a cylindrical structure such that creases are not formed within the paper or sheeting. To form the roll, the paper or other sheeting material is curved over itself around a center axis such that a spiral is formed when the roll is viewed from the end of the cylindrical structure.

Rotation: As used in this disclosure, rotation refers to the cyclic movement of an object around a fixed point or fixed axis. The verb of rotation is to rotate.

Scroll: As used in this disclosure, a scroll is a sheeting that is stored as a roll.

Sentiment: As used in this disclosure, a sentiment refers to a symbolic meaning or message that is communicated through the use of an image, potentially including a text based image. See image and optical character recognition.

Sheeting: As used in this disclosure, a sheeting is a material, such as a paper, textile, a plastic, or a metal foil, in the form of a thin flexible layer or layers. The two surfaces of the sheeting with the greatest surface area are called the faces of the sheeting.

Slit: As used in this disclosure, a slit is a long narrow cut or opening that is formed in or through an object.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Token: As used in this disclosure, a token is a marker used to identify the location of a player on the board of a board based game.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A sports coaching tactical table kit comprising
a working surface, a plurality of field images, and a plurality of operational tokens;
wherein an individual field image selected from the plurality of field images attaches to the working surface;
wherein each of the plurality of operational tokens attaches to the selected individual field image;
wherein the sports coaching tactical table kit forms a structure that presents a model of game play that provides: a) a three-dimensional image of a field of play; b) a representation of locations and movements of the critical game elements present on the field of play; and c) a representation of the motion and movements of the players on the field of play;
wherein the plurality of operational tokens comprises a plurality of team tokens, a plurality of opposition tokens, and a plurality of field tokens;
wherein each of the plurality of team tokens is a token that represents a player of a first team that is on the field of play of the game;
wherein each of the plurality of opposition tokens is a token that represents a player of a second team that is on the field of play of the game;
wherein each of the plurality of field tokens is a token that represents a game structure that is found on the field of play of the game;
wherein the plurality of team tokens comprises a collection of individual team player tokens;
wherein each individual team player token comprises a team disk and a team player indicia;
wherein the team disk is formed from a magnetic material;
wherein the team disk magnetically attaches to the individual field image attached to the working surface;
wherein the team player indicia is an indicia that presents the sentiment of a number;
wherein the team player indicia is displayed from a face of the disk structure of its associated team disk;
wherein the team player indicia displayed on the team disk of any first individual team player token selected from the plurality of team tokens is visually distinct from the team player indicia of any second team disk of any second individual team player token selected from the plurality of team tokens;
wherein the working surface forms a horizontally oriented surface that is elevated above a supporting surface;
wherein a third panel, a fourth panel, and a third plurality of living hinges is used to form a collapsible table that supports the working surface when in use;
wherein the plurality of living hinges attaches the third panel to the second panel; and, the fourth panel to the third panel;
wherein the third panel attaches to the second panel such that the third panel rotates relative to the second panel;
wherein the fourth panel attaches to the third panel such that the fourth panel rotates relative to the third panel;
wherein the working surface is able to collapse into a smaller volume when not in use.

2. The sports coaching tactical table kit according to claim 1
wherein the plurality of field images are interchangeable such that the game represented by the sports coaching tactical table kit can be changed;
wherein the plurality of operational tokens are interchangeable such that the game situations represented by the sports coaching tactical table kit can be changed.

3. The sports coaching tactical table kit according to claim 2
wherein each of the plurality of field images is a sheeting that presents an individual field image of the playing field of the game being presented on the sports coaching tactical table kit;
wherein each of the plurality of field images removably attaches to the working surface such that any first individual field image attached to the working surface interchanges with any second individual field image selected from the plurality of field images;
wherein each of the plurality of field images is a magnetic structure;
wherein each of the plurality of field images magnetically attaches to the working surface such that any individual field image selected from the plurality of field images remains securely in place during the use of the sports coaching tactical table kit.

4. The sports coaching tactical table kit according to claim 3
wherein each of the plurality of operational tokens is a token that represents an element of the game associated with an individual field image selected from the plurality of field images;
wherein each of the plurality of operational tokens is partially formed from a magnetic material such that any selected token will magnetically attach to any individual field image that is selected for use from the plurality of field images;

wherein each of the plurality of operational tokens represents an element of the game that is modeled by the sports coaching tactical table kit.

5. The sports coaching tactical table kit according to claim 4
wherein the plurality of field images comprises a collection of individual field images;
wherein each individual field image magnetically attaches to the working surface;
wherein each individual field image customizes the sports coaching tactical table kit for use with a specific game.

6. The sports coaching tactical table kit according to claim 5
wherein each individual field image comprises a display sheeting and an applied image;
wherein the applied image is an image that is applied to the first plate.

7. The sports coaching tactical table kit according to claim 6
wherein the display sheeting is a sheeting;
wherein the display sheeting is a flexible structure such that the display sheeting can be rolled into a scroll for storage;
wherein the display sheeting is coated with a coating that provides the display sheeting with magnetic properties;
wherein the display sheeting attaches magnetically to the working surface;
wherein the form factor of the display sheeting is geometrically similar to the form factor of the first plate such that the display sheeting fits within the perimeter of the first plate.

8. The sports coaching tactical table kit according to claim 7
wherein each applied image is a soccer field;
wherein the applied image displays the image of a soccer field to accommodate the use of the sports coaching tactical table kit for teaching soccer.

9. The sports coaching tactical table kit according to claim 8
wherein the individual team player token is a token selected from the plurality of team tokens;
wherein any first individual team player token selected from the plurality of team tokens is visually distinct from any second individual team player token selected from the plurality of team tokens such that each of the plurality of team tokens is uniquely identified while attached to the individual field image selected for use on the working surface;
wherein the plurality of opposition tokens comprises a collection of individual opposition player tokens;
wherein each individual opposition player token is a token selected from the plurality of opposition tokens;
wherein any first individual opposition player token selected from the plurality of opposition tokens is visually distinct from any second individual opposition player token selected from the plurality of opposition tokens such that each of the plurality of opposition tokens can be uniquely identified while attached to the individual field image selected for use on the working surface;
wherein each of the plurality of field tokens is formed from a magnetic material such that each field token magnetically attaches to the display sheeting of the individual field image attached to the working surface;
wherein each of the plurality of field tokens is placed on the display sheeting of the individual field image to indicate the position of a game structure relative to the sentiment presented by the applied image.

10. The sports coaching tactical table kit according to claim 9
wherein each of the plurality of opposition tokens is formed from a magnetic material such that each team token magnetically attaches to the display sheeting of the individual field image attached to the working surface;
wherein each of the plurality of opposition tokens is placed on the display sheeting of the individual field image to indicate the position of a player relative to the sentiment presented by the applied image;
wherein each individual opposition player token is visually distinct from each individual team player token;
wherein each individual opposition player token comprises an opposition disk and an opposition player indicia;
wherein the opposition disk is formed from a magnetic material;
wherein the opposition disk magnetically attaches to the individual field image attached to the working surface;
wherein the opposition player indicia is an indicia that presents the sentiment of a number;
wherein the opposition player indicia is displayed from a face of the disk structure of its associated opposition disk;
wherein the opposition player indicia displayed on the opposition disk of any first individual opposition player token selected from the plurality of opposition tokens is visually distinct from the opposition player indicia of any second opposition disk of any second individual opposition player token selected from the plurality of opposition tokens.

11. The sports coaching tactical table kit according to claim 10
wherein the plurality of field tokens comprises a plurality of goal sets, a plurality of flag sets, and a plurality of ball tokens;
wherein each of the plurality of goal sets is a token that visibly represents one or more goals used in a game of soccer;
wherein each of the plurality of flag sets is a token that visibly represents one or more flags used in the game of soccer;
wherein each of the plurality of ball tokens is a token that identifies a soccer ball as a controlled object.

12. The sports coaching tactical table kit according to claim 11
wherein the plurality of goal sets comprises a soccer goal set;
wherein the soccer goal set is a visual representation of the two goals commonly used in a game of soccer;
wherein the soccer goal set further comprises a full size goal set and a reduced size goal set;
wherein the full size goal set is a visual representation of the two full size goals commonly used in a professional game of soccer;
wherein the reduced size goal set is a visual representation of the two reduced size goals commonly used in an amateur game of soccer;
wherein the plurality of flag sets comprises a soccer flag set;
wherein the soccer flag set is a visual representation of the flags that are commonly used to mark the corners in a game of soccer;

wherein the soccer ball is a visual representation of the ball that is used in the game of soccer.

13. The sports coaching tactical table kit according to claim 1 wherein the working surface is formed as an inflatable structure;

wherein the working surface continues to receive the plurality of field images and the plurality of operating tokens;

wherein the inflatable structure is inflated for use, and deflated when not in use or for transport.

14. The sports coaching tactical table kit according to claim 1 wherein the working surface is positioned atop of a plurality of telescopic stanchions;

wherein the plurality of telescopic stanchions attach to the working surface such that the working surface forms a horizontally oriented surface that is elevated above a supporting surface;

wherein the span of the length of each of the plurality of telescopic stanchions is adjustable such that the elevation of the working surface is adjustable;

wherein the plurality of telescopic stanchions attach to the working surface such that each of the plurality of telescopic stanchions rotates relative to the working surface;

wherein the combination of the living hinge and the rotation of the plurality of telescopic stanchions allows the third sports coaching tactical table kit to collapse for storage.

15. The sports coaching tactical table kit according to claim 1 wherein the working surface is positioned atop of a first plurality of stanchions and a plurality of gussets;

wherein the first plurality of stanchions elevate the working surface above the supporting surface;

wherein the plurality of gussets brace the first plurality of stanchions to the working surface.

* * * * *